United States Patent
Wenger

(10) Patent No.: US 11,403,431 B2
(45) Date of Patent: Aug. 2, 2022

(54) CRYPTOGRAPHIC PROCESSING DEVICE AND METHOD FOR CRYPTOGRAPHICALLY PROCESSING DATA

(71) Applicant: Infineon Technologies AG, Neubiberg (DE)

(72) Inventor: Erich Wenger, Munich (DE)

(73) Assignee: Infineon Technologies AG, Neubiberg (DE)

( * ) Notice: Subject to any disclaimer, the term of this patent is extended or adjusted under 35 U.S.C. 154(b) by 272 days.

(21) Appl. No.: 16/867,954

(22) Filed: May 6, 2020

(65) Prior Publication Data

US 2020/0394336 A1  Dec. 17, 2020

(30) Foreign Application Priority Data

Jun. 13, 2019 (DE) .......................... 102019116104.5

(51) Int. Cl.

| G06F 21/00 | (2013.01) |
|---|---|
| H04L 29/06 | (2006.01) |
| G06F 21/72 | (2013.01) |
| G06F 7/544 | (2006.01) |
| G06F 7/44 | (2006.01) |
| G09C 1/00 | (2006.01) |

(52) U.S. Cl.
CPC .............. *G06F 21/72* (2013.01); *G06F 7/446* (2013.01); *G06F 7/5443* (2013.01); *G09C 1/00* (2013.01)

(58) Field of Classification Search
CPC ........ G06F 21/72; G06F 7/446; G06F 7/5443; G06F 7/523; G06F 21/602; G06F 21/64; G09C 1/00; H04L 2209/122; H04L 9/30
See application file for complete search history.

(56) References Cited

U.S. PATENT DOCUMENTS

| 5,524,090 A * | 6/1996 | Iwamura | ................. | G06F 7/722 |
| | | | | 708/620 |
| 5,880,985 A * | 3/1999 | Makineni | .............. | G06F 7/5338 |
| | | | | 708/628 |

(Continued)

*Primary Examiner* — Lisa C Lewis
(74) *Attorney, Agent, or Firm* — Banner & Witcoff Ltd.

(57) ABSTRACT

A cryptographic processing device for cryptographically processing data, having a memory configured to store a first operand and a second operand represented by the data to be cryptographically processed, wherein the first operand and the second operand each correspond to an indexed array of data words, and a cryptographic processor configured to determine, for cryptographically processing the data, a product of the first operand with the second operand by accumulating results of partial multiplications, each partial multiplication comprising the multiplication of a data word of the first operand with a data word of the second operand wherein the cryptographic processor is configured to perform the partial multiplications in successive blocks of partial multiplications, each block being associated with a result index range and a first operand index range and each block comprising all partial multiplications between data words of the first operand within the first operand index range with data words of the second operand such that a sum of indices of the data word of the first operand and of the data word of the second operand is within the result index range.

20 Claims, 7 Drawing Sheets

(56) References Cited

U.S. PATENT DOCUMENTS

| | | | | |
|---|---|---|---|---|
| 8,356,064 B1* | 1/2013 | Chen | ............... | G06F 17/142 |
| | | | | 708/404 |
| 2008/0195685 A1* | 8/2008 | Olofsson | ............... | G06F 7/53 |
| | | | | 708/523 |
| 2017/0357484 A1* | 12/2017 | Dyka | ............... | G06F 7/5324 |
| 2018/0088905 A1* | 3/2018 | Klein | ............... | G06F 7/443 |
| 2018/0152288 A1* | 5/2018 | Kang | ............... | G06F 21/55 |
| 2018/0307489 A1* | 10/2018 | Kennedy | ............... | G06F 7/5443 |

* cited by examiner

CRYPTOGRAPHIC PROCESSING DEVICE AND METHOD FOR CRYPTOGRAPHICALLY PROCESSING DATA

TECHNICAL FIELD

The present disclosure relates to cryptographic processing devices and methods for cryptographically processing data.

BACKGROUND

In cryptographic processing of data, such as calculation of a signature, encryption or decryption of data, the multiplication and addition of large integers are typical operations which are to be carried out a high number of times. This is in particular the case in asymmetric cryptography based on ECC (elliptic curve cryptography) or RSA (Rivest, Shamir, Adleman). Therefore, especially the multiplication, with its quadratic complexity, usually defines the majority of the runtime of the cryptographic processing of data. Accordingly, approaches for optimizing the multiplication of large integers is desirable for cryptographic processing performance.

SUMMARY

According to various embodiments, a cryptographic processing device is provided including a memory configured to store a first operand and a second operand represented by data to be cryptographically processed, wherein the first operand and the second operand each correspond to an indexed array of data words, and a cryptographic processor configured to determine, for cryptographically processing the data, the product of the first operand with the second operand by accumulating the results of partial multiplications, each partial multiplication including the multiplication of a data word of the first operand with a data word of the second operand wherein the cryptographic processor is configured to perform the partial multiplications in successive blocks of partial multiplications, each block being associated with a result index range and a first operand index range and each block including all partial multiplications between data words of the first operand within the first operand index range with data words of the second operand such that the sum of indices of the data word of the first operand and of the data word of the second operand is within the result index range.

According to a further embodiment, a method for cryptographically processing data according to the above cryptographic processing device is provided.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which.

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

DETAILED DESCRIPTION

Figure 1:
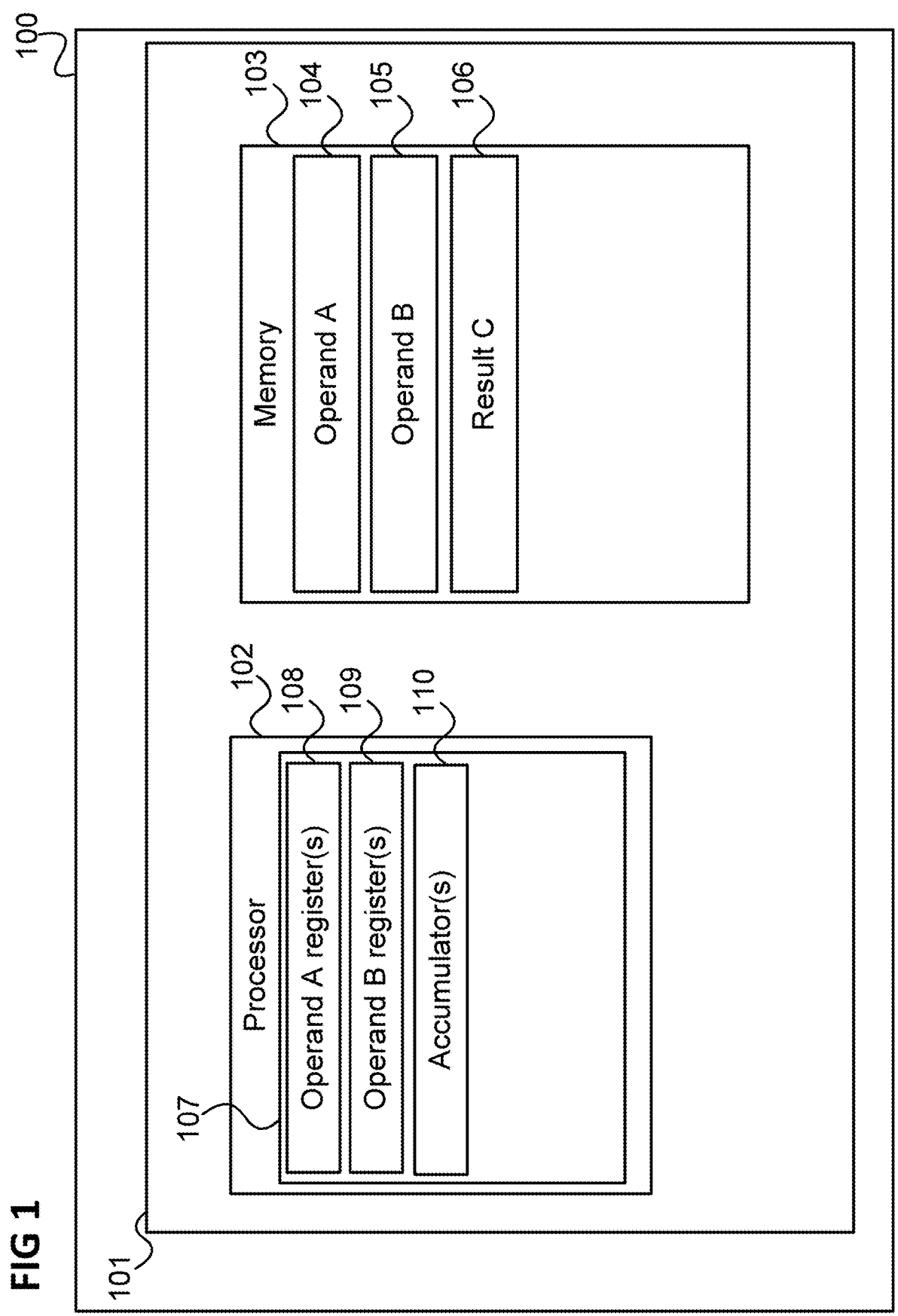
FIG. 1 shows an example of a data processing device.

FIG. 1 shows an example of a data processing device 100.

The data processing device 100 may be a computer, or a controller or a microcontroller, e.g. in a vehicle, e.g. an ECU (Electronic Control Unit) in a car. It may also be a chip card integrated circuit (IC) of a smart card such as a smart card of any form factor, e.g. for a passport or for a SIM (Subscriber Identity Module).

The data processing device 100 has an integrated circuit in the form of a chip 101. The chip 101 may be a control chip and implement a processor 102 and a memory 103, e.g. a RAM (Random Access Memory). It should be noted that the processor 102 and the memory 103 may also be implemented on separate chips. The chip 101 may also be, for example, an RFID (Radio Frequency Identification) chip or implement a SIM (Subscriber Identity Module) for a mobile phone. The chip 101 may be provided for a security application, i.e. may be a security chip. For example, the memory 103 stores secret data used for a cryptographic operation, e.g. to authenticate a user or to encrypt/decrypt or to sign data, for example according to an asymmetric cryptography scheme.

Asymmetric cryptography based on ECC (elliptic curve cryptography) or RSA (Rivest, Shamir, Adleman) require the addition and multiplication of long integers (typically with a length of 256 bits to 4096 bits). Also, e.g., the isogeny-based post-quantum algorithm SIKE requires the same. Especially the multiplication, with its quadratic complexity, usually defines the majority of the runtime of those applications. To compute these algorithms efficiently on a processor 102 (or coprocessor), the long integers may be split into words of 32 bit or 64 bit length. A hardware implementation may follow a similar approach.

In the following, examples are described in which two operands A and B, stored in arrays 104, 105 in the memory 103 as A[ ] and B[ ] are processed, i.e. multiplied. Both operands are n-words large (i.e. are vectors of n words). The product C[ ]=A[ ]*B[ ] is stored as 2n-word large array 106.

The processor 102 includes a register set 107 in which it stores data it operates on, e.g. one or more registers 108 for storing data (e.g. one or more words) of A, one or more registers 109 for storing data (e.g. one or more words) of B and one or more result registers (e.g. accumulators) 110 for storing and accumulating results of partial multiplications.

Figure 2:
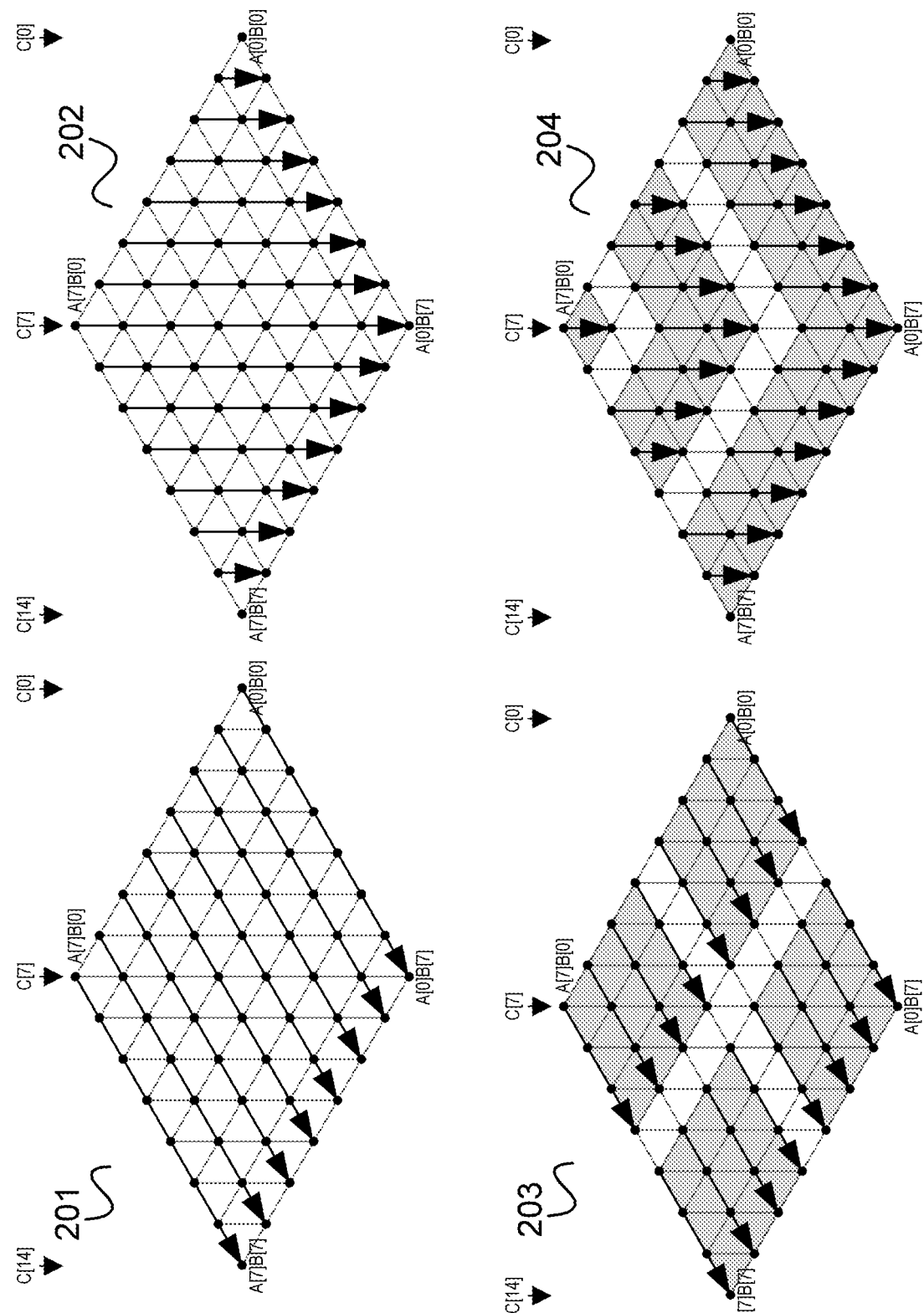
FIG. 2 shows four diagrams, each illustrating an approach for multiplication of two operands.

FIG. 2 shows four diagrams 201, 202, 203, 204, each illustrating an approach for multiplication of two operands.

The diagrams 201 to 204 illustrate the multiplication approaches for n=8. Each dot in the diagrams 201 to 204 represents a multiplication of words of the operands A and B. Arrows indicate the order in which the processor 102 performs partial multiplications one after the other.

The first diagram 201 illustrates the operand-scanning or schoolbook multiplication method. According to this multiplication approach, the processor 102 loads one operand word A[i] (into register set 107, e.g. a register 108) and multiplies A[i] with all B[j] (which are successively loaded to a register 109) before moving on to the next operand A[i+1]. The resulting product (for each A[i]) is added to the intermediate product C[ ] in memory 103.

The second diagram 202 illustrates product-scanning or column-wise multiplication method. According to this multiplication approach, all A[i] are multiplied with B[j] wherein the sum of i+j is kept constant. After summing up all intermediate products (for constant i+j, e.g. in an accumulator 110), the resulting C[i+j] is stored back to memory 103. Then the next column i+j+1 is processed.

The third diagram 203 illustrates the hybrid multiplication method which can be seen to combine the operand-scanning method and the product scanning method. Globally, it performs product scanning. Locally, it performs operand-scanning. While the product scanning reduces the number of necessary load instructions (i.e. loads to register set 107 from memory 103), the local operand-scanning is performed on the local registers 107 of a processor 102. The register set 107 stores a 2d+2 words large accumulator and a d-size operand. The other operand can be loaded to register set 107 and processed iteratively.

The fourth diagram 204 illustrates the operand-caching multiplication method. This method performs product-scanning locally and operand-scanning globally. It trades additional load/store (LD/ST) instructions for the more efficient use of the local register set 107. Only three words are needed for the accumulator 110 and 2e words are used to cache the processed operands (e being a design parameter).

The methods illustrated in FIG. 2 were designed to efficiently use an available register set 107 of a processor 102 in software. In hardware there is a similar challenge. The challenge is to reduce the number of memory accesses with registers, and consequently achieve the best performance, with a minimal number of added registers.

Figure 3:
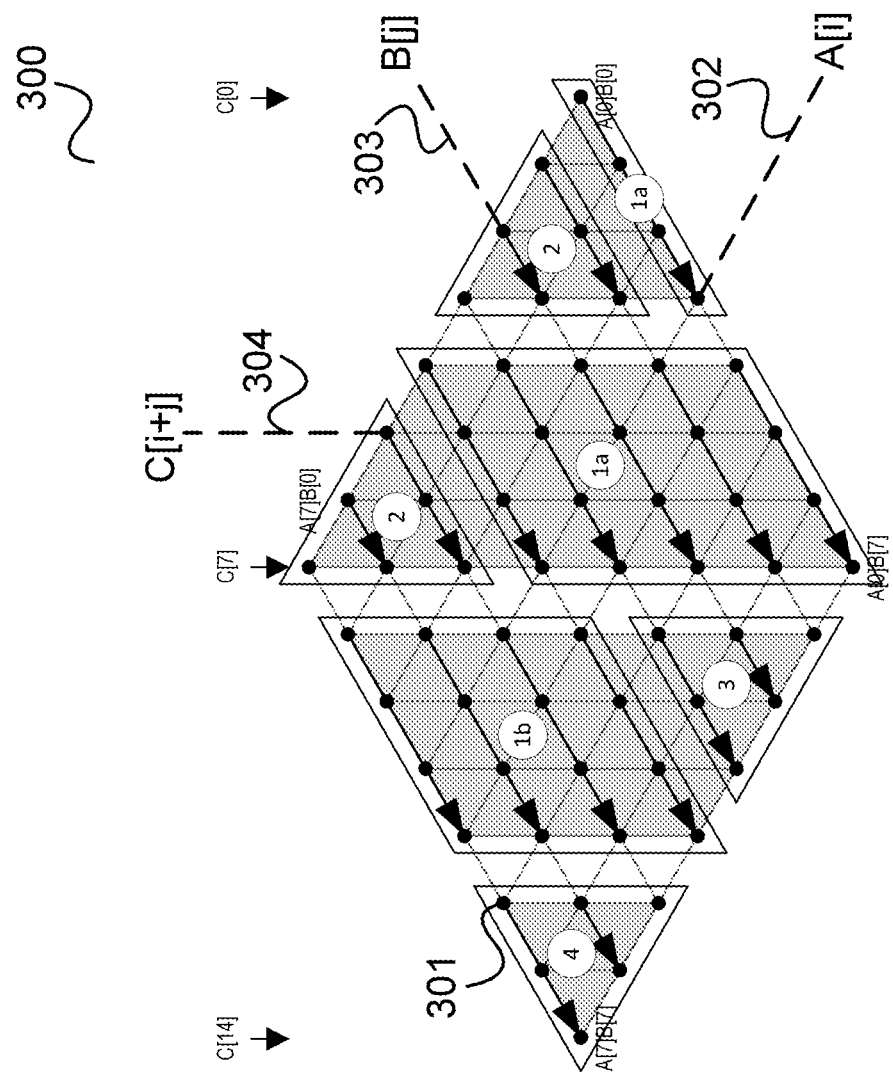
FIG. 3 shows a diagram illustrating a multiplication method according to an embodiment.

FIG. 3 shows a diagram 300 illustrating a multiplication method according to an embodiment.

Similarly to the diagrams of FIG. 2, the diagram 300 illustrates the multiplication approaches for n=8, each dot 301 represents a multiplication of words of the operands A and B and arrows indicate the order in which partial multiplications are performed one after the other.

In the form in the two-dimensional representation of the overall multiplication of FIG. 3, each "row" 302 (from top right to bottom left) corresponds to an A[i], each "diagonal" 304 corresponds to a B[j] and each "column" 304 corresponds to a C[i+j].

The multiplication method of FIG. 3 is denoted as parallel-product scanning. The parallel-product scanning performs globally product scanning and locally operand-scanning. In the local register-file 107, it keeps 2+f accumulator registers 110 and f operand registers 108, 109. It is assumed that each operand register 108, 109 and each accumulator register 110 stores one word.

From one processed operand A[i] to A[i+1], f−1 local registers of operand B[ ] can be re-used (and do not need to be fetched again from memory 103).

In FIG. 3, blocks of word multiplications 301 of three different base types are shown: block types 1 (with variants 1a and 1b), 2 and 3. The block type 1a occurs two times (a big and a small version) and the block type 2 occurs two times. The other block types occur only one time. It should be noted that FIG. 3 is a simple example with n=8. For higher n, the various block types may occur much more often.

It should be noted that the blocks form, from left to right, block columns $$(4), \binom{1b}{3}, \binom{2}{1a}, \binom{2}{1a}.$$

Block columns are similarly formed in case of higher dimensions.

The blocks types differ in their form in the two-dimensional representation of the overall multiplication of FIG. 3. Accordingly, in an implementation of parallel-product scanning according to an embodiment based on the blocks, the operations carried out may be different for different blocks.

The blocks with the biggest performance impact are blocks 1a and 1b. They have a width of f=4 columns in the example of FIG. 3.

For each of the f columns, one A[i] (of the current row 302) is multiplied with the local B[j] (of the current diagonal 303) and added to the local accumulator 110 (for the current column 304). In other words, results of partial multiplications are accumulated taking the indices of the data words of the operands into account. This means that A[i]*B[j] for all pairs of i, j with i+j being constant need to be accumulated for the result data word C[i+j]. If the maximum value of the data word C[i+j] is exceeded the exceeding amount is carried over to the next data words C[i+j+1] and (possibly) C[i+j+2].

According to one embodiment, the processor 102 processes the blocks from right to left and bottom to top, i.e. (small) block 1a, (right) block 2, (big) block 1a, (left) block 2, block 3, block 1b block 4. The processor 102 processes each of the blocks row-wise from bottom to top. From one row 302 to the next, f−1 words of B[ ] can be re-used. See for example (big) block 1a: in the bottom row, the leftmost B (which is B[7]) may not be re-used for the row above, while the others (B[6], B[5], B[4]) can. B[3] has to be loaded. In other words, B[7] is exchanged for B[3].

The difference between the blocks 1a and 1b is that while the processor 102 can start processing block 1b with already cached (i.e. loaded) words of B[ ], it needs to start the processing of the blocks 1a with loading all necessary words of B[ ]. In turn, the processor 102 finishes the processing of block 1b by storing the accumulated multiplications to C[ ] in the memory 103 in result array 106.

In the processing of blocks 2, the processor 102 stores the accumulated registers to the destination memory array for C[ ] 106. When the processor processes blocks 2, it still performs local operand-scanning, just processing shorter rows (e.g. in comparison to block 1a). As all necessary words of B[ ] are already available from the respective preceding block 1a, it does not need to fetch further words of B[ ]. Only additional words of A[ ] need to be fetched. In the end, there are only two accumulator registers 110 left over, i.e. still allocated, namely those storing the two most significant words of the result of processing block 2. Those two are forwarded (carried over) to the following block column (as the two least significant accumulator words).

At the start of block 3, only the two accumulator registers 110 storing the carried over words are allocated. At this point, according to one embodiment, there are sufficient registers available to load all A[i] and B[j] that are needed within block 3. Once the processor 102 has processed a row with an A[i], it can re-purpose the register 108 storing the A[i] as an additional accumulator register 110. From one row 302 to the next, the accumulator increases by one word register 110, until the accumulator finally requires f+2 words, i.e. includes f+2 accumulator registers 110 of one word each.

In the following, possible implementation details ("tweaks") are described which can both be applied for software and hardware implementations. They in particular include approaches to efficiently process a single row.

Reducing the Necessary Additions

While the representation of FIG. 3 can be seen suggest processing the local B [i] incrementally, it is typically more efficient to iterate the even and odd B [i] separately. This way, the number of necessary ADC (add with carry) operations can be reduced.

The following example code (modified ARM code for better readability) is for f=4. B[j+1 . . . j+3] are reused from the previous row. B[j . . . j+2] are reused in the subsequent row.

LDR A[i]
LDR B[j]
MUL RH,RL□□A[i]*B[j]
ADD Acc0□□Acc0+RL
ADC Acc1□□Acc1+RH+C
MUL RH,RL□□A[i]*B[j+2]
ADC Acc2□□Acc2+RL+C
ADC Acc3□□Acc3+RH+C
ADC Acc4□□Acc4+C
ADC Acc5□□Acc5+C
MUL RH,RL□□A[i]*B[j+1]
ADD Acc1□□Acc1+RL
ADC Acc2□□Acc2+RH+C
MUL RH,RL□□A[i]*B[j+3]
ADC Acc3□□Acc3+RL+C
ADC Acc4□□Acc4+RH+C
ADC Acc5□□Acc5+C

Using a Second Acc(f) Register

When the even and odd operands B[j] are processed separately, there is the point where the carry needs to be propagated across two registers. By having an additional register to accumulate these carry separately, the number of additions can be reduced. Only at the end of a column the extra accumulated carry bits need to be added to the other accumulator register.

Loading A[i] and B[j] Separately

The above code example loads A[i] and B[j] consecutively. Then f registers are needed to store operand B[j . . . j+f−1] and one register is needed to store A[i]; f+1 in total. However, it is possible to reduce the number of necessary registers to f registers by loading A[i] and B[j] separately. First, A[i] is loaded and multiply-accumulated with B[j+1], B[j+3], . . . , B[j+f−1]. At this point the register of B[j+f−1] can be reused to keep the to-be-loaded B[j]. Only then, A[i] is combined with B[j], B[j+2], . . . , B[j+f−2]. This saves one register. Note that saving two registers means that the parameter f can be increased by one (when assuming a fixed number of registers in the register set 102.

The following example loads A[i] and B[j] separately and uses a second Acc4X register to accumulate carries. Acc4X has to be added to (Acc5, Acc4) at the end of the processed column.

LDR A[i]
MUL RH,RL□□A[i]*B[j+1]
ADD Acc1□□Acc1+RL
ADC Acc2□□Acc2+RH+C
MUL RH,RL□□A[i]*B[j+3]
ADC Acc3□□Acc3+RL+C
ADC Acc4□□Acc4+RH+C
ADC Acc5□□Acc5+C LDR B[j] (override register B[j+3])
MUL RH,RL□□A[i]*B[j]
ADD Acc□□0 Acc0+RL
ADC Acc1 □□Acc1+RH+C
MUL RH,RL□□A[i]*B[j+2]
ADC Acc2□□Acc2+RL+C
ADC Acc3□□Acc3+RH+C
ADC Acc4X□□Acc4X+C Handling the Case of n Mod f≠0

The parallel-product scanning can also be adapted to handling the case of n mod f≠0.

Figure 4:
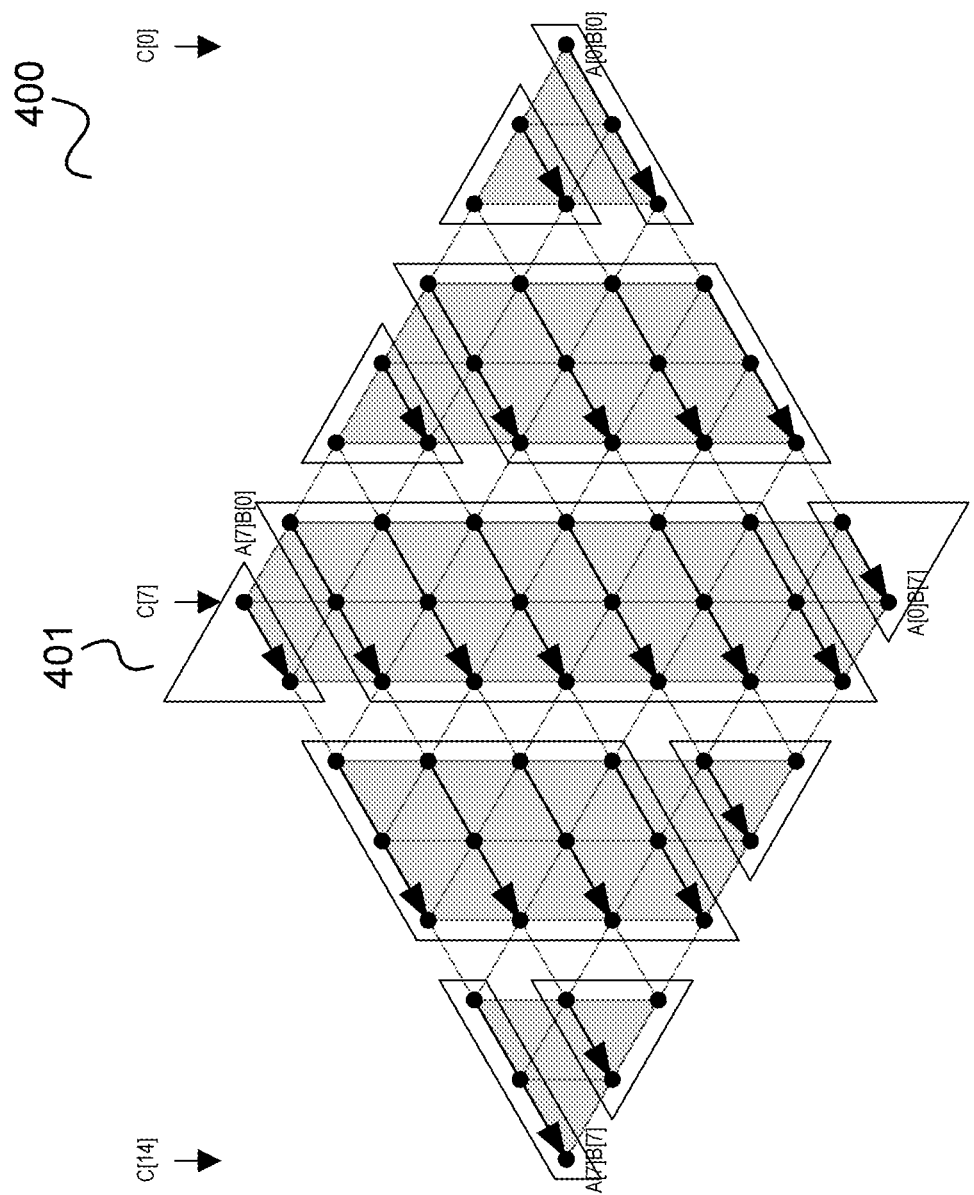
FIG. 4 shows a diagram illustrating an example for handling a multiplication for a special case of parameters.

FIG. 4 shows a diagram 400 illustrating an example how that case can be handled efficiently. The middle block column 401 can be seen as column that starts (at the bottom) with a modified version of block 3, has a block 1 in the middle, and ends (at the top) with a modified version of block 2.

Looping the Product-Scanning

For high performance, the whole multi-precision multiplication may be unrolled. However, this may only be reasonable up to a certain code size. Certain systems with instruction caches may actually be faster with a looped implementation, as less code needs to be fetched from memory.

For a fully looped implementation, the outer loop iterates through all the block-columns. The inner loop performs unrolled blocks 2 and 3 and a looped version of block 1. The block 1 is split into f-sized sub-blocks that handles f rows. After f rows, it can be assured that the cache registers B[j] have the same logical ordering again.

Figure 5:
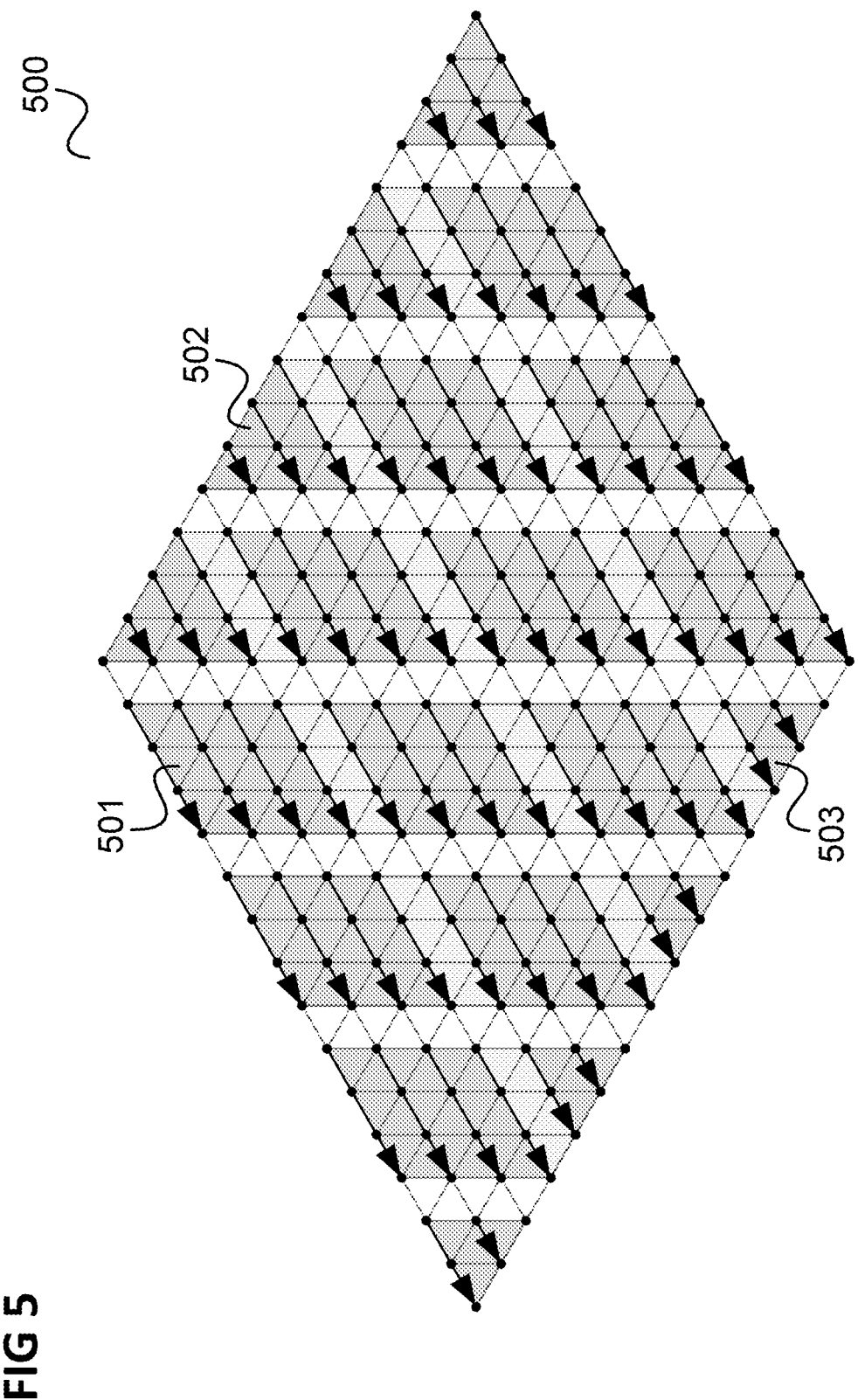
FIG. 5 shows a diagram illustrating an example for a looped implementation.

FIG. 5 shows a diagram 500 illustrating an example for a looped implementation with n=16 and f=4.

As can be seen, it includes blocks 501 of type 1, blocks 502 of type 2 and blocks 503 of type 3 similarly to the example of FIG. 3 but in higher numbers.

Freeing Up Local Registers

Three pointer registers are necessary to address the arrays A[ ], B[ ], C[ ] in memory 103 (typically their start addresses). By assuming that the operand arrays are stored in relation to the stack pointer the corresponding pointer registers can be re-purposed to increase the design parameter f. A bigger design parameter in turn reduces the number of necessary memory accesses and additions. For the gained performance, it might also be feasible to copy A[ ] and B[ ] to the stack at the beginning of the multiplication and the stacked C[ ] back to its destination memory 106 at the end of the multi-precision multiplication. Especially in ARM's embedded processors, this implementation tweak can make a difference to improve the performance.

Re-Use Operands Between Processed Set of Columns

For ease of implementation the block-columns can be processed top-down or bottom-up only. However, by alternating the order, it is possible to re-use the remaining operands from one column to the next. This form of product scanning can be referred to as 'zigzag'.

It should be noted that both the hybrid scanning and the parallel-product scanning can be seen to globally perform a variant of product scanning. The difference between the two scanning approaches is local: the hybrid method splits the multiplication in diamond-like shapes (see the third diagram 203 of FIG. 2) and needs a 2d+2 (word) large accumulator. The parallel-product scanning can be seen to process many columns in parallel. It thereby reduces the necessary accumulator to f+2 words.

Similar to operand-caching, the parallel-product scanning uses the register file 107 as cache of operands from one iteration (row) to the next. As explained above, f−1 words of operand B[ ] can be reused from row to row. The operand-caching (see the fourth diagram 204 of FIG. 2) can be seen to globally perform an operand-scanning like approach. The parallel-product scanning can be seen to globally perform a product scanning like approach. It therefore gets rid of the extra load/store operation required from one row of operands to the next.

Table 1 gives a comparison of the complexity for the different multiplication methods. Regarding the necessary memory accesses, it is a close call between the hybrid and the operand-caching multiplication method. The hybrid method needs ~$2n^2/d$ memory accesses using ~$3d$ registers. The operand-caching method needs more memory accesses (~$3n^2/e$), but needs less registers (~$2e$).

TABLE 1

| | Load Instructions | Store Instructions | Memory Accesses | Needed registers (#regs) | Memory Accesses per registers |
|---|---|---|---|---|---|
| Operand-scanning | $2n^2 + n$ | $n^2 + n$ | $3n^2 + 2n$ | | |
| Product Scanning | $2n^2$ | $2n$ | $2n^2 + 2n$ | | |
| Hybrid | $2\lceil n^2/d \rceil$ | $2n$ | $2\lceil n^2/d \rceil + 2n$ | $3d + 2$ | ~$6n^2/$#regs |
| Operand-caching | $2n^2/e$ | $n^2/e + n$ | $3n^2/e + n$ | $2e + 3$ | ~$6n^2/$#regs |
| Parallel-Product Scanning | $2n(n-1)/f + 2n$ | $2n$ | $2n^2/f + 4n - 2n/f$ | $2f + 2$ | ~$4n^2/$#regs |

The parallel-product scanning method can be seen to unite the advantages of both the hybrid and the operand-caching multiplication. It only needs $2n^2/f$ memory accesses and only needs ~$2f$ local registers. This is even more apparent when the number of memory accesses per used register is compared. While the hybrid and the operand-caching need ~$6n^2/$#regs memory accesses, the parallel-product scanning only requires ~$4n^2/$#regs registers (where #regs is the number of available registers in the register-set).

Although the memory operations usually come with a big performance penalty, the number of necessary additions can make a difference as well. For example, in assembly implementations performing the hybrid method there may be a focus on reducing the number of additions to improve the multiplication performance.

Both the product-scanning and operand-caching require roughly $3n^2$ additions (three additions per multiply-accumulate). Here the hybrid and the parallel-product scanning have an advantage. The larger the accumulators are (2*d+2 in hybrid, f+2 in parallel-product scanning), the closer the performance is to the theoretical minimum of $2n^2$ additions. The parallel-product scanning requires $(2+2/f)n^2$ additions.

The parallel-product scanning can be applied in software as well as in hardware. In software parallel-product scanning allows an efficient use of the available register set 107 and with a low number of necessary load, store, and addition operations. According to one embodiment, parallel-product scanning is implemented on a RISC CPU (reduced instruction set computer central processing unit).

In hardware, the parallel product scanning can be applied to minimize the number of necessary load operations by adding a limited set of local registers.

Figure 6:
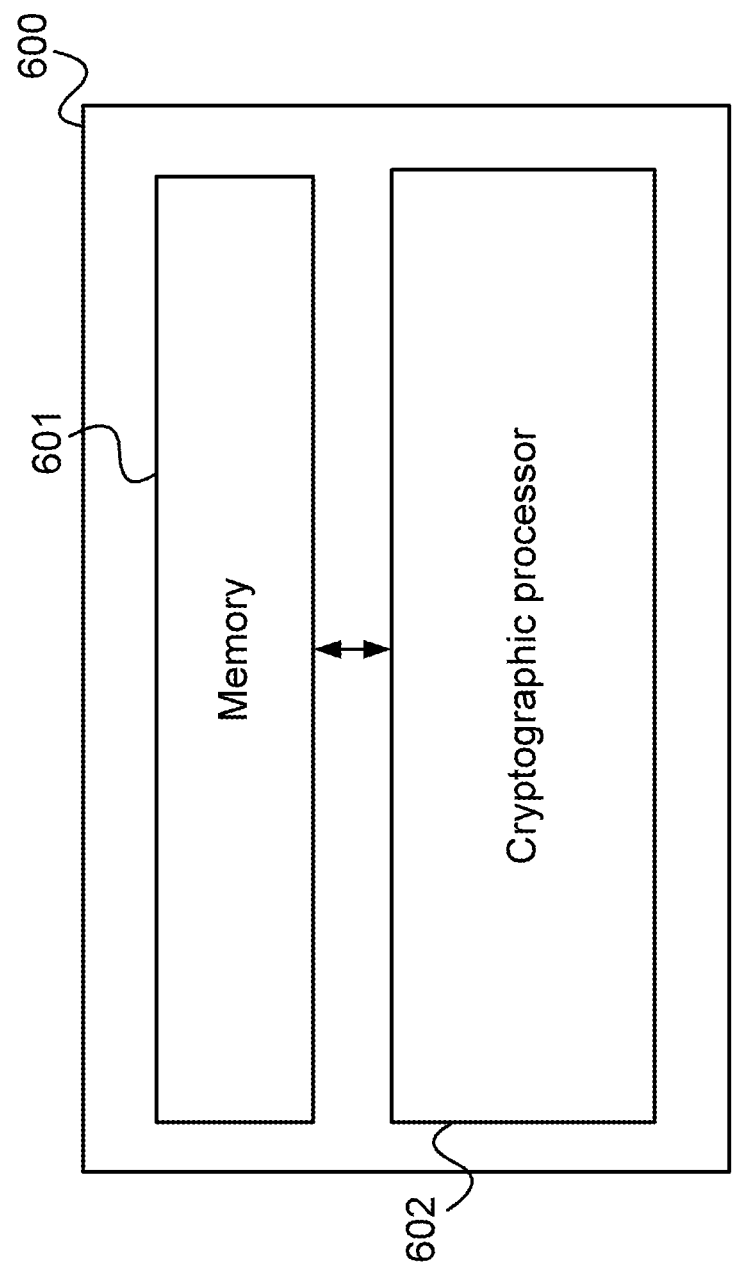
FIG. 6 shows a cryptographic processing device according to an embodiment.

In summary, according to various embodiments, a cryptographic processing device is provided as illustrated in FIG. 6.

FIG. 6 shows a cryptographic processing device 600 according to an embodiment.

The cryptographic processing device 600 includes a memory 601 configured to store a first operand and a second operand represented by data to be cryptographically processed, wherein the first operand and the second operand each correspond to an indexed array of data words.

Further, the cryptographic processing device 600 includes a cryptographic processor 602 configured to determine, for cryptographically processing the data, the product of the first operand with the second operand by accumulating the results of partial multiplications, each partial multiplication including the multiplication of a data word of the first operand with a data word of the second operand.

The cryptographic processor 602 is configured to perform the partial multiplications in successive blocks of partial multiplications, each block being associated with a result index range and a first operand index range (e.g. including a plurality of first operand indices and for example corresponding to a value range of the index j of the operand B in the example of FIG. 3) and each block including all partial multiplications between data words of the first operand within the first operand index range with data words of the second operand such that the sum of indices of the data word of the first operand and of the data word of the second operand is within the result index range.

According to various embodiments, in other words, the cryptographic processor groups partial multiplications (i.e. combinations of a first operand data words with a second data operand data word) to groups (or blocks) such that, if the digits of the first operand are consecutively numbered by indices and the digits of the second operand are consecutively numbered by indices, the group includes combinations of digits of the first operand with digits of the second operand such that the sum of indices of the digit of the first operand and of the digit of the second operand is within a predetermined first range (of size f in the examples described above) and the indices of the digits of the first operand are within a predetermined second range (height of the blocks in the examples described above, e.g. the range of index j of B[j] for a block in the example of FIG. 3).

The result index range (or first range) and the first operand index range (or second range) are larger than 1. For example, the result index range is 2 or 4 as in the examples above (or another integer like 5, 8 etc.). The first operand index range depends on the location of the block in the two-dimensional representation and may be maximum such that the block still fits in the grid of partial multiplications illustrated by the two-dimensional representation.

Illustratively, when a two-dimensional representation of the partial multiplications as illustrated in the above-described figures (e.g. FIG. 3) is considered, the groups are sections of block columns, going from a first row to a second row. The width of the block columns corresponds to the result index range and the height of a group corresponds to the first operand index range.

The blocks may in particular include "parallelogram" blocks such as blocks 1a and 1b, i.e. blocks for which the number of second operand data words multiplied with each first operand data word is constant. For such a block, the cryptographic processor processes the block by proceeding over the data words of the first operand wherein from data word to data word of the first operand, all but one data word of the second operand are kept and one additional data word of the second operand is loaded (i.e. one data word is replaced). It should be noted that also from block to block, operands may be kept in registers.

The height of the parallelogram blocks (first operand index range) may be maximum based on the predetermined result index range. This means that when the block width f is given, the height of the block may be as large as possible such that the resulting block has still parallelogram shape.

It should be noted that the data words of the operands and the result may be seen as digits. The data words may for example each include 16 bit, 32 bit or 64 bit but other values are also possible. The operands may be integers, for example of a size of 256 bits to 4096 bits.

The cryptographic processing device or at least the cryptographic processor may be a secure element, e.g. may correspond to or may be part of a hardware security module (HSM).

The cryptographic processing device may receive at least a part of the data to be cryptographically processed via a communication network connection including a wired or wireless communication connection, e.g. a radio communication network connection such as an RFID connection.

The cryptographic processing device may for example correspond to the data processing device 100 of FIG. 1 configured to perform parallel-product scanning (multi-precision) multiplication.

Figure 7:
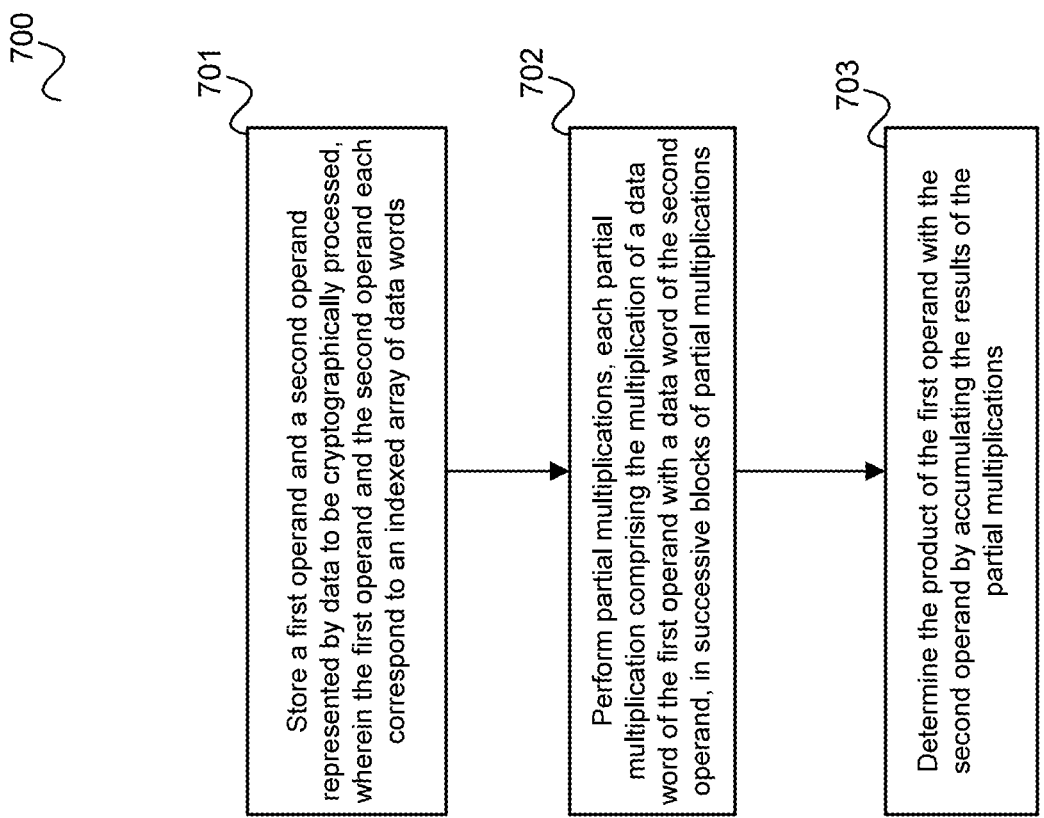
FIG. 7 shows a flow diagram illustrating a method for cryptographically processing data according to an embodiment.

According to various embodiments, a device performs a method as illustrated in FIG. 7.

FIG. 7 shows a flow diagram 700 illustrating a method for cryptographically processing data according to an embodiment.

In 701, the device stores a first operand and a second operand represented by data to be cryptographically processed, wherein the first operand and the second operand each correspond to an indexed array of data words.

In 702, the device performs partial multiplications, each partial multiplication including the multiplication of a data word of the first operand with a data word of the second operand, in successive blocks of partial multiplications, each block being associated with a result index range and a first operand index range and each block including all partial multiplications between data words of the first operand within the first operand index range with data words of the second operand such that the sum of indices of the data word of the first operand and of the data word of the second operand is within the result index range.

In 703, the device determines the product of the first operand with the second operand by accumulating the results of the partial multiplications.

Various Examples are described in the following:

Example 1 is a cryptographic processing device as illustrated in FIG. 6.

Example 2 is the cryptographic processing device according to Example 1, wherein the cryptographic processor is configured to perform the partial multiplications included in the block according to a sequence of the data words of the first operand.

Example 3 is the cryptographic processing device according to Example 2, wherein performing the partial multiplications according to the sequence of the data words of the first operand includes, starting from a first data word of the sequence of the data words of the first operand, performing all the partial multiplications for a current data word of the first operand included in the block and then proceeding to the next data word of the sequence of the data words of the first operand.

Example 4 is the cryptographic processing device according to Example 3, wherein the cryptographic processor is configured to, when proceeding from a current data word of the sequence of data words of the first operand to a next data word of the sequence of data words of the first operand, keep at least all but one data words of the second operand stored in registers for multiplying them with the next data word of the sequence of data words of the first operand.

Example 5 is the cryptographic processing device according to Example 3 or 4, wherein the cryptographic processor is configured to, when proceeding from a current data word of the sequence of data words of the first operand to a next data word of the sequence of data words of the first operand, depending on the partial multiplications included in the block, keep all data words of the second operand stored in registers for multiplying them with the next data word of the sequence of data words of the first operand, keep all data words but one of the second operand stored in registers for multiplying them with the next data word of the sequence of data words of the first operand, load an additional data word of the second operand from memory or exchange one data word of the second operand stored in registers by another data word of the second operand stored in the memory.

Example 6 is the cryptographic processing device according to any one of Examples 1 to 5, wherein the cryptographic processor is configured to, when processing a block, store successive data words of the first operand to a first operand register and, for each data word of the first operand stored in the first operand register, store a respective set of data words of the second operand in second operand registers.

Example 7 is the cryptographic processing device according to any one of Examples 1 to 6, wherein the data includes data to be decrypted or to be encrypted, a cryptographic key, data for a cryptographic key exchange and/or a cryptographic signature.

Example 8 is the cryptographic processing device according to any one of Examples 1 to 7, wherein the cryptographic processing device is configured to derive the first operand and the second operand from the data to be cryptographically processed.

Example 9 is the cryptographic processing device according to any one of Examples 1 to 8, further including an input configured to receive at least a part of the data to be cryptographically processed.

Example 10 is the cryptographic processing device according to Example 9, wherein the input is configured to receive at least a part of the data via a communication network connection.

Example 11 is the cryptographic processing device according to any one of Examples 1 to 10, wherein the cryptographic processor is configured to store the product in the memory corresponding to an indexed result array of data words, Example 12 is the cryptographic processing device according to any one of Examples 1 to 11, wherein the cryptographic processor is configured to, for an index of the result array, accumulate the partial multiplications of a data word of the first operand having a first index with a data word of the second operand having a second index, wherein the sum of the first index and the second index is the index of the result array.

Example 13 is the cryptographic processing device according to any one of Examples 1 to 12, wherein the partial multiplications include all combinations of data words of the first operand with data words of the second operand.

Example 14 is a method for cryptographically processing data as illustrated in FIG. 7.

Example 15 is the method according to Example 14, including performing the partial multiplications included in the block according to a sequence of the data words of the first operand.

Example 16 is the method according to Example 15, wherein performing the partial multiplications according to the sequence of the data words of the first operand includes, starting from a first data word of the sequence of the data words of the first operand, performing all the partial multiplications for a current data word of the first operand included in the block and then proceeding to the next data word of the sequence of the data words of the first operand.

Example 17 is the method according to Example 16, including, when proceeding from a current data word of the sequence of data words of the first operand to a next data word of the sequence of data words of the first operand, keeping at least all but one data words of the second operand stored in registers for multiplying them with the next data word of the sequence of data words of the first operand.

Example 18 is the method according to Example 16 or 17, including, when proceeding from a current data word of the sequence of data words of the first operand to a next data word of the sequence of data words of the first operand, depending on the partial multiplications included in the block, keeping all data words of the second operand stored in registers for multiplying them with the next data word of the sequence of data words of the first operand, keeping all data words but one of the second operand stored in registers for multiplying them with the next data word of the sequence of data words of the first operand, loading an additional data word of the second operand from memory or exchanging one data word of the second operand stored in registers by another data word of the second operand stored in the memory.

Example 19 is the method according to any one of Examples 14 to 18, including, when processing a block, storing successive data words of the first operand to a first operand register and, for each data word of the first operand stored in the first operand register, storing a respective set of data words of the second operand in second operand registers.

Example 20 is the method according to any one of Examples 14 to 19, wherein the data includes data to be decrypted or to be encrypted, a cryptographic key, data for a cryptographic key exchange and/or a cryptographic signature.

Example 21 is the method according to any one of Examples 14 to 20, including deriving the first operand and the second operand from the data to be cryptographically processed.

Example 22 is the method according to any one of Examples 14 to 21, further including receiving at least a part of the data to be cryptographically processed.

Example 23 is the method according to Example 22, including receiving at least a part of the data via a communication network connection.

Example 24 is the method according to any one of Examples 14 to 23, including storing the product in the memory corresponding to an indexed result array of data words, Example 25 is the method according to any one of Examples 14 to 24, including, for an index of the result array, accumulating the partial multiplications of a data word of the first operand having a first index with a data word of the second operand having a second index, wherein the sum of the first index and the second index is the index of the result array.

Example 26 is the method according to any one of Examples 14 to 25, wherein the partial multiplications include all combinations of data words of the first operand with data words of the second operand.

According to a further example, a cryptographic processing device is provided including an input configured to receive data to be cryptographically processed, a memory configured to store a first operand and a second operand (at least partially) represented by the data, where the first operand and the second operand each include a plurality of digits (wherein each digit is given by a data word). The cryptographic processing device further includes a cryptographic processor configured to multiply the first operand with the second operand to generate a result by multiplying each digit of the first operand with each digit of the second operand and accumulating the results in an order of consecutive groups (or blocks) wherein each group is associated with a set of digits of the result and includes combinations of digits of a subset of digits of the first operand and, for each digit of the subset of digits of the first operand, those digits of the second operand, which, when combined with the digit of the subset of digits of the first operand, give a contribution to a digit of the set of digits of the result (wherein the contribution is meant as a "direct contribution", i.e. not a contribution by carry).

The cryptographic processing device according to any one of the examples described above may be implemented in software (i.e. by means of a processor executing a software) or in hardware (i.e. by a hard-wired hardware circuit, possibly controlled by firmware or the like).

In particular, the cryptographic processing device may be implemented by one or more circuits, wherein a "circuit" may be understood as any kind of a logic implementing entity, which may be hardware, software, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be software being implemented or executed by a processor, e.g. any kind of computer program. Any other kind of implementation of the respective functions which are described herein may also be understood as a "circuit" in accordance with an alternative embodiment.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

REFERENCE SIGNS

101 Chip
102 Processor
103 Memory
104-106 Arrays

107 Register set
108-110 Registers
201-204 Multiplication diagrams
300 Multiplication diagram
301 Partial multiplication
302 Row
303 Diagonal
304 Column
400 Multiplication diagram
401 Block-column
500 Multiplication diagram
501-503 Multiplication blocks
600 Cryptographic processing device
601 Memory
602 Cryptographic processor
700 Flow diagram
701-702 Process operations

What is claimed is:

1. A cryptographic processing device for cryptographically processing data, comprising:
   a memory configured to store a first operand and a second operand represented by data to be cryptographically processed, wherein the first operand and the second operand each correspond to an indexed array of data words; and
   a cryptographic processor configured to determine, for cryptographically processing the data, a product of the first operand with the second operand by accumulating results of partial multiplications, each partial multiplication comprising the multiplication of a data word of the first operand with a data word of the second operand;
   wherein the cryptographic processor is configured to perform the partial multiplications in successive blocks of partial multiplications, each block being associated with a result index range and a first operand index range, and each block comprising all partial multiplications between data words of the first operand within the first operand index range with data words of the second operand such that a sum of indices of the data word of the first operand and of the data word of the second operand is within the result index range.

2. The cryptographic processing device according to claim 1, wherein the cryptographic processor is configured to perform the partial multiplications included in the block according to a sequence of the data words of the first operand.

3. The cryptographic processing device according to claim 2, wherein performing the partial multiplications according to the sequence of the data words of the first operand comprises, starting from a first data word of the sequence of the data words of the first operand, performing all the partial multiplications for a current data word of the first operand included in the block and then proceeding to a next data word of the sequence of the data words of the first operand.

4. The cryptographic processing device according to claim 3, wherein the cryptographic processor is configured to, when proceeding from a current data word of the sequence of data words of the first operand to a next data word of the sequence of data words of the first operand, keep at least all but one of the data words of the second operand stored in registers for multiplying them with the next data word of the sequence of data words of the first operand.

5. The cryptographic processing device according to claim 3, wherein the cryptographic processor is configured to, when proceeding from a current data word of the sequence of data words of the first operand to a next data word of the sequence of data words of the first operand, depending on the partial multiplications included in the block, keep all of the data words of the second operand stored in registers for multiplying them with the next data word of the sequence of data words of the first operand, keep all but one of the data words of the second operand stored in registers for multiplying them with the next data word of the sequence of data words of the first operand, and load an additional data word of the second operand from memory or exchange one data word of the second operand stored in registers by another data word of the second operand stored in the memory.

6. The cryptographic processing device according to claim 1, wherein the cryptographic processor is configured to, when processing a block, store successive data words of the first operand to a first operand register and, for each data word of the first operand stored in the first operand register, store a respective set of data words of the second operand in second operand registers.

7. The cryptographic processing device according to claim 1, wherein the data to be cryptographically processed comprises data to be decrypted or to be encrypted, a cryptographic key, data for a cryptographic key exchange, or a cryptographic signature.

8. The cryptographic processing device according to claim 1, wherein the cryptographic processor is configured to derive the first operand and the second operand from the data to be cryptographically processed.

9. The cryptographic processing device according to claim 1, further comprising an input configured to receive at least a part of the data to be cryptographically processed.

10. The cryptographic processing device according to claim 9, wherein the input is configured to receive at least a part of the data via a communication network connection.

11. The cryptographic processing device according to claim 1, wherein the cryptographic processor is configured to store the product in the memory corresponding to an indexed result array of data words.

12. The cryptographic processing device according to claim 11, wherein the cryptographic processor is configured to, for an index of the result array, accumulate the partial multiplications of a data word of the first operand having a first index with a data word of the second operand having a second index, wherein the sum of the first index and the second index is the index of the result array.

13. The cryptographic processing device according to claim 1, wherein the partial multiplications include all combinations of data words of the first operand with data words of the second operand.

14. A method for cryptographically processing data, comprising:
   storing a first operand and a second operand represented by data to be cryptographically processed, wherein the first operand and the second operand each correspond to an indexed array of data words;
   performing partial multiplications, each partial multiplication comprising a multiplication of a data word of the first operand with a data word of the second operand, in successive blocks of partial multiplications, each block being associated with a result index range and a first operand index range and each block comprising all partial multiplications between data words of the first operand within the first operand index range with data words of the second operand such that the sum of indices of the data word of the first operand and of the data word of the second operand is within the result index range; and determining a product of the first operand with the second operand by accumulating results of the partial multiplications.

15. The method according to claim 14, wherein the partial multiplications included in the block are performed according to a sequence of the data words of the first operand.

16. The method according to claim 15, wherein the performing the partial multiplications according to the sequence of the data words of the first operand comprises, starting from a first data word of the sequence of the data words of the first operand, performing all the partial multiplications for a current data word of the first operand included in the block and then proceeding to a next data word of the sequence of the data words of the first operand.

17. The method according to claim 16, further comprising, when proceeding from a current data word of the sequence of data words of the first operand to a next data word of the sequence of data words of the first operand, keeping at least all but one of the data words of the second operand stored in registers for multiplying them with the next data word of the sequence of data words of the first operand.

18. The method according to claim 16, further comprising, when proceeding from a current data word of the sequence of data words of the first operand to a next data word of the sequence of data words of the first operand, depending on the partial multiplications included in the block, keeping all of the data words of the second operand stored in registers for multiplying them with the next data word of the sequence of data words of the first operand, keeping all but one of the data words of the second operand stored in registers for multiplying them with the next data word of the sequence of data words of the first operand, and loading an additional data word of the second operand from memory or exchange one data word of the second operand stored in registers by another data word of the second operand stored in the memory.

19. The method according to claim 14, further comprising, when processing a block, storing successive data words of the first operand to a first operand register and, for each data word of the first operand stored in the first operand register, storing a respective set of data words of the second operand in second operand registers.

20. The method according to claim 14, wherein the data to be cryptographically processed comprises data to be decrypted or to be encrypted, a cryptographic key, data for a cryptographic key exchange, or a cryptographic signature.

* * * * *